Dec. 8, 1959  G. T. KOEHLER  2,916,255
DIAPHRAGM VALVE
Filed Feb. 18, 1957
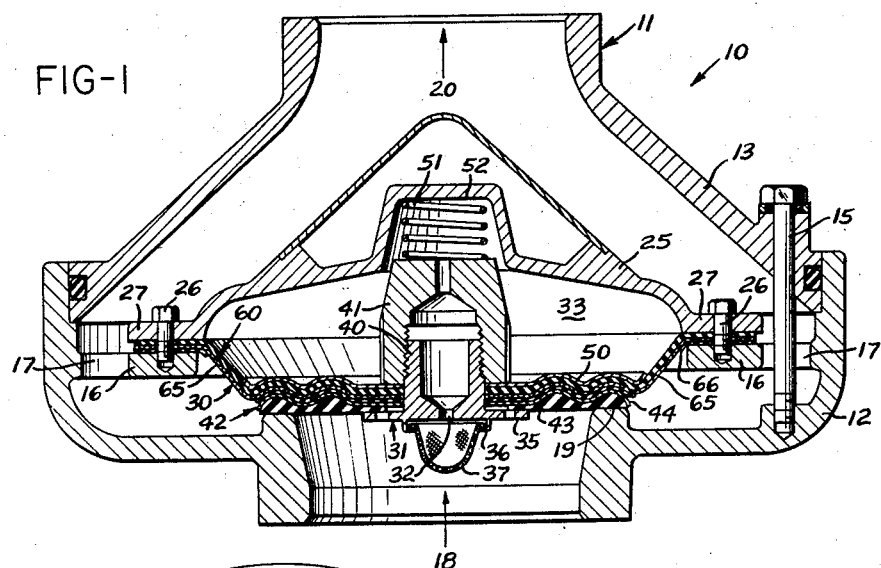
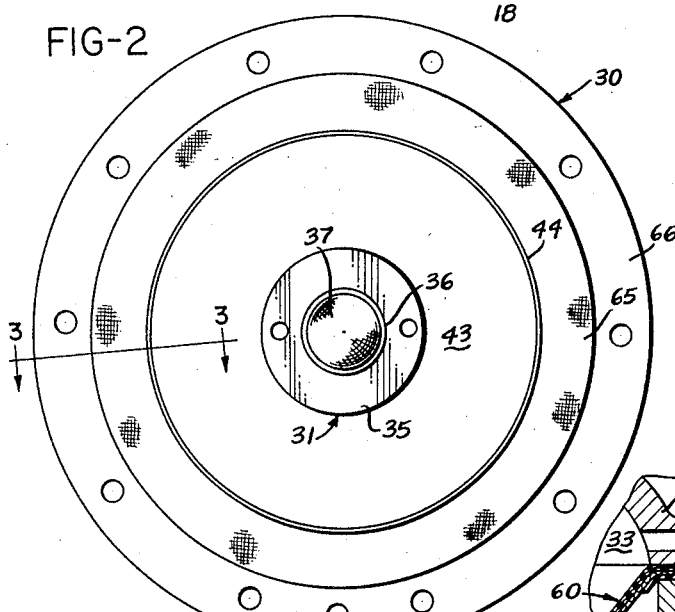
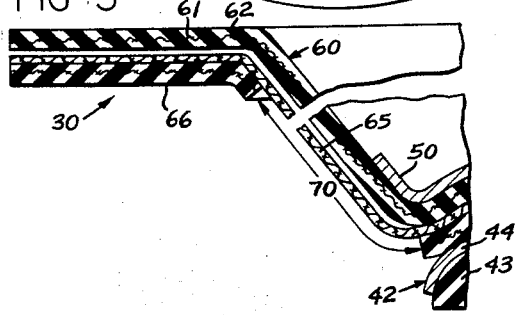
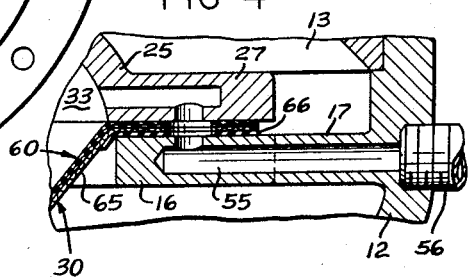
INVENTOR.
GORDON T. KOEHLER
BY
Marechal, Biebel, French & Bugg
ATTORNEYS

United States Patent Office 2,916,255
Patented Dec. 8, 1959

2,916,255

DIAPHRAGM VALVE

Gordon T. Koehler, Dayton, Ohio, assignor to Koehler Aircraft Products Company, Dayton, Ohio, a corporation of Ohio Application February 18, 1957, Serial No. 640,951

4 Claims. (Cl. 251—331)

This invention relates to diaphragms for fuel systems and the like and more particularly to a multilaminar diaphragm having improved flexibility at low temperatures and which retain adequate strength to resist operating pressures.

Devices such as valves and related fluid flow regulators which utilize a diaphragm as the means for effecting operation of fluid control means in response to pressure differentials in the fluid system, often have limited application due to the inability of the diaphragm to resist rupture under extreme operating conditions. For instance, maintenance of an integral diaphragm which must operate at low temperatures, is extremely difficult due to the embrittling effect of the cold on the diaphragm material.

It is accordingly a principal object of this invention to provide an improved diaphragm structure which has adequate strength and will retain its flexibility at extremely low temperatures thus preventing rupturing of the diaphragm due to cold embrittlement.

It is a further object of this invention to provide a multilaminar diaphragm structure in which one membrane is constructed of a fabric which is porous in the region where maximum flexure of the diaphragm occurs to provide strength to the diaphragm while maintaining flexibility.

It is another object of this invention to provide a valve mechanism utilizing the novel diaphragm construction in accordance with the present invention.

Other objects and advantages of this invention will be apparent from the following description, the accompanying drawings and the appended claims.

In the drawings:

Fig. 1 is a cross sectional view through a typical valve employing a multilaminar diaphragm according to the present invention;

Fig. 2 is a bottom elevational view of the present diaphragm structure showing the valve assembly;

Fig. 3 is a somewhat enlarged sectional view taken along the line 3—3 of Fig. 2 to show the manner in which the various laminae of the diaphragm are arranged; and Fig. 4 is a fragmentary view of a valve with part of the casing wall removed to show the construction of the bleed port.

Referring to Fig. 1 valve structure 10 comprises a casing 11 including a lower housing member 12 and an upper housing member 13, the two housing members being held together by a plurality of studs 15 which extend through housing 13 for threaded engagement with housing 12. Lower member 12 has a ring 16 attached to the inner wall thereof by radially extending ribs 17 and defines an inlet opening 18 having a valve seat 19. Upper housing member 13 forms an outlet opening 20 through which fluid flows in passing from the valve. A diaphragm housing 25 is removably secured to ring 16 by studs 26 which extend through an annular flange 27 on housing 25 to threadably engage the ring 16.

A multilaminar diaphragm 30, with appropriate holes formed adjacent the outer periphery thereof, receives studs 26 as they extend through annular flange 27 into ring 16 to secure the diaphragm in operating position between the diaphragm housing 25 and ring 16 along the entire outer periphery thereof.

The center portion of diaphragm 30 receives valve means 31 which defines a generally centrally located orifice or fluid passage 32 to permit fluid flow from inlet opening 18 into the chamber 33 formed by the diaphragm housing 25 and the diaphragm 30. Valve means 31 includes a plate like member 35 having an inwardly turned rib-like flange 36 on the front face to retain filtering screen 37 which prevents the possible entry of dirt or other contaminants into fluid passage 32. The rear or upstream surface of plate 35 has a rearwardly extending internally threaded nipple or projection 40 for threaded engagement with an extension 41.

A valve member 42 is mounted on the nipple 40, and includes a resilient sealing gasket 43, of rubber or the like, and a reinforcing and mounting plate 44 to which facing 43 is integrally bonded. The backing plate is preferably constructed of a corrosion resistant material like stainless steel, copper, brass, etc., although the particular material used will be, to some measure, dependent upon the nature of the fluid being controlled by the valve. Following valve member 42 on nipple 40 is the diaphragm 30 which is in turn followed by a ribbed plate 50 of similar construction but of slightly larger diameter than the aforementioned ribbed reinforcing plate 44. The extension 41 is appropriately secured to the nipple 40 to retain the various components in position.

The diaphragm 30 together with the parts making up the valve means 31 is referred to generally as the diaphragm assembly.

A coil spring 51 abuts the upper end of extension 41 and extends upwardly therefrom into contact with the surface 52 of diaphragm housing 25 to insure that the valve member 42 will be normally urged toward its closed position against valve seat 19.

As shown in Fig. 4, casing 11 is provided with a bleed port 55 which extends through the diaphragm housing 25, ring 16 and rib 17 for connection to a fluid conducting pipe 56 leading to a float controlled shut off valve or other source of regulatory pressure. Port 55, as is clearly shown, communicates with the chamber 33 between diaphragm housing 25 and the rear surface of the diaphragm 30. An exemplary manner in which suitable regulatory pressure is supplied to the valve dependent upon the quantity of fluid present in a storage container is shown in copending application of Koehler et al. Serial No. 345,044, filed March 27, 1953, assigned to the same assignee as this application, now Patent No. 2,843,145, issued July 15, 1958.

Referring now to Figs. 2 and 3, the diaphragm 30 comprises a fluid impervious cup-shaped membrane 60 of sufficient thinness to insure flexibility and freedom from brittleness even when operating at sub-zero temperatures such as —65° F., as an example. It is advantageous that membrane 60 be kept thin since the flexibility depends to some degree upon the thickness of the material composing the membrane. Therefore, a thin fabric 61 has been coated with a thin coating of an elastomeric material to achieve the thin fluid impervious membrane 60. It is also possible that a molded, fluid impervious diaphragm having no fabric center could be used to obtain a membrane of the proper thickness. Use of such a thin membrane introduces the problem of achieving sufficient strength to resist rupture, a problem which is not solved by merely enlarging or increasing the size of fabric and the thickness of elastomeric material, since this merely increases the thickness of the final membrane thereby also increasing the stiffness and the tendency toward brittleness.

To enable membrane 60 to withstand operating forces, a fabric membrane 65 of cotton, nylon, rayon or other suitable material, is secured adjacent membrane 60 by placing membrane 65 in abutting relationship with membrane 60 and holding it there by means of the casing 11 and plates 44 and 50. Such operating forces may include a normal pressure of 35 to 50 p.s.i. with surge pressures of 225 to 300 p.s.i. upon the closing of the valve, as examples. Membrane 65 is slightly smaller in diameter than membrane 60 so that it is drawn slightly tighter than membrane 60 when mounted, to insure that membrane 65 will absorb substantially all of the forces. Membrane 60 and 65 remain separate at all times as shown in Fig. 3. In this manner strength to resist rupturing is imparted to diaphragm 30 without increasing the thickness of diaphragm 60 so that there is no material loss of flexibility at low temperatures.

As additional reinforcing means, the membrane 65 is constructed with concentric fluid impervious reinforcing members 66 which limit the permeability of member 65 to the zone 70 between the reinforcing rings. The concentric rings are constructed of a rubberized cotton fabric suitably bonded to the fabric membrane 65 and are particularly useful in assuring adequate strength adjacent the inner and outer peripheries of the membrane to preclude any tendency toward ripping or tearing which may occur due to the holes through which the various mounting studs extend. Thus, the edge portions of membrane 65 are strengthened while the zone of maximum flexure, 70, is without elastomeric material which may induce cracking at low temperatures.

While the form of apparatus herein described constitutes a preferred embodiment of the invention, it is to be understood that this invention is not limited to the precise form of apparatus and that changes may be made therein without departing from the scope of the invention which is described in the appended claims.

What is claimed is:

1. In a valve mechanism for controlling the supply of fluid under pressure and including a housing, a valve seat in said housing in the path of flow of said fluid, and a valve member to regulate the flow of fluid, the combination with said valve mechanism of a multilaminar flexible diaphragm carrying said valve member for engagement with said valve seat comprising; a fluid impervious membrane sufficiently thin to insure flexibility thereof under low temperature conditions and consequently having low resistance to rupture at normal fluid operating pressures, a porous fabric membrane having relatively great resistance to rupture in contacting relationship with said impervious membrane to strengthen said diaphragm while maintaining the flexibility thereof, annular means securing outer annular portions of said membranes to said housing with the areas thereof inwardly of said securing means free to move toward and away from said valve seat, and said inner area of said porous membrane being smaller than said inner area of said impervious membrane to maintain said porous membrane tighter under pressure than said impervious membrane.

2. In a valve mechanism for controlling the supply of fluid under pressure and including a housing, a valve seat in said housing in the path of flow of said fluid, and a valve member to regulate the flow of fluid, the combination with said valve mechanism of a multilaminar flexible diaphragm having inner and outer edges and carrying said valve member for engagement with said valve seat comprising, a fluid impervious membrane sufficiently thin to insure flexibility thereof under low temperature conditions and consequently having low resistance to rupture at normal fluid operating pressures, a porous fabric membrane having relatively great resistance to rupture supported in contacting relationship with said impervious membrane, said porous fabric membrane being of less radial extent and drawn tighter than said impervious membrane to absorb the operating forces while maintaining the flexibility of said diaphragm, and concentric fluid impervious reinforcing members secured to said porous membrane adjacent the inner and outer edges thereof in spaced apart relation defining a ring-like porous zone of said porous membrane between said impervious reinforcing members to retain maximum flexibility in said zone.

3. A diaphragm assembly comprising a first membrane formed of thin flexible impervious material, a second membrane distinct from said first membrane and formed of flexible and porous reinforcing material, annular membrane retaining means operable to hold said second membrane in superimposed tensioned relation with respect to said first membrane, and the area of said second membrane inwardly of said retaining means being smaller than the corresponding area of said first membrane to maintain said second membrane tighter under pressure than said first membrane.

4. A diaphragm assembly comprising a first membrane formed of thin flexible impervious material, a second membrane received in superimposed relation upon said first membrane and formed of porous and flexible reinforcing material having inner and outer ring-shaped elastomeric reinforcing portions secured thereto, the portion of said second membrane between said reinforcing portions being of less radial extent and drawn tighter than the corresponding portion of said first membrane and circumferential membrane retaining means operable to hold said second membrane at said outer reinforcing portion in tensioned relation to said first membrane.

References Cited in the file of this patent

UNITED STATES PATENTS

| | | |
|---|---|---|
| 1,489,349 | Hampton | Apr. 8, 1924 |
| 1,802,136 | Carter | Apr. 21, 1931 |
| 2,705,123 | Heiger | Mar. 29, 1955 |
| 2,774,379 | Sweeney | Dec. 18, 1956 |
| 2,775,983 | Johnson et al. | Jan. 1, 1957 |
| 2,779,687 | Buchanan | Jan. 29, 1957 |
| 2,808,484 | Beck et al. | Oct. 1, 1957 |